(12) United States Patent
Chasin

(10) Patent No.: US 9,015,472 B1
(45) Date of Patent: Apr. 21, 2015

(54) MARKING ELECTRONIC MESSAGES TO INDICATE HUMAN ORIGINATION

(75) Inventor: C. Scott Chasin, Denver, CO (US)

(73) Assignee: McAfee, Inc., Santa Clara, CA (US)

( * ) Notice: Subject to any disclaimer, the term of this patent is extended or adjusted under 35 U.S.C. 154(b) by 2205 days.

(21) Appl. No.: 11/372,970

(22) Filed: Mar. 10, 2006

Related U.S. Application Data

(60) Provisional application No. 60/660,311, filed on Mar. 10, 2005.

(51) Int. Cl.
*H04L 29/06* (2006.01)
*H04L 9/00* (2006.01)

(52) U.S. Cl.
CPC ..................................... *H04L 9/002* (2013.01)

(58) Field of Classification Search
USPC .......... 709/224, 223, 204–207; 455/466, 403; 707/1, 3, 4; 713/164–167, 186; 726/34–36; 379/70, 79, 80; 340/5.2–5.86; 715/751–753
See application file for complete search history.

(56) References Cited

U.S. PATENT DOCUMENTS

| | | |
|---|---|---|
| 4,771,400 A | 9/1988 | Omura et al. |
| 4,868,376 A | 9/1989 | Lessin et al. |
| 4,932,054 A | 6/1990 | Chou et al. |
| 4,967,389 A | 10/1990 | Omura et al. |
| 4,972,474 A | 11/1990 | Sabin |
| 5,081,676 A | 1/1992 | Chou et al. |
| 5,210,710 A | 5/1993 | Omura |
| 5,222,133 A | 6/1993 | Chou et al. |
| 5,337,357 A | 8/1994 | Chou et al. |
| 5,546,463 A | 8/1996 | Caputo et al. |
| 5,627,764 A | 5/1997 | Schutzman et al. |
| 5,638,444 A | 6/1997 | Chou et al. |
| 5,704,008 A | 12/1997 | Duvall, Jr. |
| 5,737,424 A | 4/1998 | Elteto et al. |
| 5,778,071 A | 7/1998 | Caputo et al. |
| 5,790,790 A | 8/1998 | Smith et al. |
| 5,796,833 A | 8/1998 | Chen et al. |
| 5,826,011 A | 10/1998 | Chou et al. |
| 5,878,142 A | 3/1999 | Caputo et al. |
| 5,884,033 A | 3/1999 | Duvall et al. |
| 5,937,161 A | 8/1999 | Mulligan et al. |

(Continued)

FOREIGN PATENT DOCUMENTS

| | | |
|---|---|---|
| EP | 1949240 | 7/2008 |
| JP | 2001-265674 | 9/2001 |

(Continued)

OTHER PUBLICATIONS

Final Office Action mailed May 27, 2009 in U.S. Appl. No. 10/888,370, filed Jul. 9, 2004, by C. Scott Chasin.

(Continued)

*Primary Examiner* — Thanhnga B Truong
*Assistant Examiner* — Josnel Jeudy
(74) *Attorney, Agent, or Firm* — Patent Capital Group

(57) ABSTRACT

Systems and methods for marking electronic messages to indicate human origination are provided. According to one embodiment, an electronic message and information verifying the electronic message is human originated are received. Then, the fact that the electronic message is human originated is conveyed to one or more recipients of the electronic message by associating with the electronic message a human origination indication.

12 Claims, 1 Drawing Sheet

(56) References Cited

U.S. PATENT DOCUMENTS

| | | |
|---|---|---|
| 5,937,162 A | 8/1999 | Funk et al. |
| 5,987,610 A | 11/1999 | Franczek et al. |
| 5,996,077 A | 11/1999 | Williams |
| 6,003,027 A | 12/1999 | Prager |
| 6,005,940 A | 12/1999 | Kulinets |
| 6,021,438 A | 2/2000 | Duvvoori et al. |
| 6,052,709 A | 4/2000 | Paul |
| 6,061,448 A | 5/2000 | Smith et al. |
| 6,073,142 A | 6/2000 | Geiger et al. |
| 6,119,137 A | 9/2000 | Smith et al. |
| 6,128,741 A | 10/2000 | Goetz et al. |
| 6,141,686 A | 10/2000 | Jackowski et al. |
| 6,151,675 A | 11/2000 | Smith |
| 6,161,130 A | 12/2000 | Horvitz et al. |
| 6,167,136 A | 12/2000 | Chou |
| 6,192,360 B1 | 2/2001 | Dumais et al. |
| 6,192,407 B1 | 2/2001 | Smith et al. |
| 6,195,425 B1 * | 2/2001 | Farris .............................. 379/230 |
| 6,240,436 B1 | 5/2001 | McGregor |
| 6,249,805 B1 | 6/2001 | Fleming, III |
| 6,266,692 B1 | 7/2001 | Greenstein |
| 6,278,782 B1 | 8/2001 | Ober et al. |
| 6,282,290 B1 | 8/2001 | Powell et al. |
| 6,282,657 B1 | 8/2001 | Kaplan et al. |
| 6,307,936 B1 | 10/2001 | Ober et al. |
| 6,321,267 B1 | 11/2001 | Donaldson |
| 6,381,634 B1 | 4/2002 | Tello et al. |
| 6,385,655 B1 | 5/2002 | Smith et al. |
| 6,389,455 B1 | 5/2002 | Fuisz |
| 6,393,465 B2 | 5/2002 | Leeds |
| 6,397,331 B1 | 5/2002 | Ober et al. |
| 6,400,810 B1 | 6/2002 | Skladman et al. |
| 6,412,069 B1 | 6/2002 | Kavsan |
| 6,421,709 B1 | 7/2002 | McCormick et al. |
| 6,434,585 B2 | 8/2002 | McGregor et al. |
| 6,438,583 B1 | 8/2002 | McDowell et al. |
| 6,438,612 B1 | 8/2002 | Ylonen et al. |
| 6,453,415 B1 | 9/2002 | Ober |
| 6,460,050 B1 | 10/2002 | Pace et al. |
| 6,463,538 B1 | 10/2002 | Elteto |
| 6,470,086 B1 | 10/2002 | Smith |
| 6,487,599 B1 | 11/2002 | Smith et al. |
| 6,493,007 B1 | 12/2002 | Pang |
| 6,507,866 B1 | 1/2003 | Barchi |
| 6,523,119 B2 | 2/2003 | Pavlin et al. |
| 6,529,956 B1 | 3/2003 | Smith et al. |
| 6,546,416 B1 | 4/2003 | Kirsch |
| 6,587,549 B1 | 7/2003 | Weik |
| 6,609,196 B1 | 8/2003 | Dickinson, III et al. |
| 6,615,241 B1 | 9/2003 | Miller et al. |
| 6,615,242 B1 | 9/2003 | Riemers |
| 6,618,747 B1 | 9/2003 | Flynn et al. |
| 6,631,472 B2 | 10/2003 | Kaplan et al. |
| 6,643,686 B1 | 11/2003 | Hall |
| 6,643,687 B1 | 11/2003 | Dickie et al. |
| 6,643,688 B1 | 11/2003 | Fuisz |
| 6,650,890 B1 | 11/2003 | Irlam et al. |
| 6,651,166 B1 | 11/2003 | Smith et al. |
| 6,654,465 B2 | 11/2003 | Ober et al. |
| 6,654,787 B1 | 11/2003 | Aronson et al. |
| 6,671,808 B1 | 12/2003 | Abbott et al. |
| 6,678,734 B1 | 1/2004 | Haatainen et al. |
| 6,704,871 B1 | 3/2004 | Kaplan et al. |
| 6,708,273 B1 | 3/2004 | Ober et al. |
| 6,711,615 B2 | 3/2004 | Porras et al. |
| 6,725,381 B1 | 4/2004 | Smith et al. |
| 6,732,101 B1 | 5/2004 | Cook |
| 6,732,157 B1 | 5/2004 | Gordon et al. |
| 6,748,529 B2 | 6/2004 | Smith |
| 6,757,830 B1 | 6/2004 | Tarbotton et al. |
| 6,769,016 B2 | 7/2004 | Rothwell et al. |
| 6,772,196 B1 | 8/2004 | Kirsch et al. |
| 6,802,012 B1 | 10/2004 | Smithson et al. |
| 6,826,609 B1 | 11/2004 | Smith et al. |
| 6,829,635 B1 | 12/2004 | Townshend |
| 6,842,773 B1 | 1/2005 | Ralston et al. |
| 6,847,825 B1 | 1/2005 | Duvall et al. |
| 6,850,602 B1 * | 2/2005 | Chou .............................. 379/80 |
| 6,868,498 B1 | 3/2005 | Katsikas |
| 6,876,858 B1 | 4/2005 | Duvall et al. |
| 6,901,509 B1 | 5/2005 | Kocher |
| 6,907,571 B2 * | 6/2005 | Slotznick ...................... 715/758 |
| 6,912,285 B2 | 6/2005 | Jevans |
| 6,941,348 B2 | 9/2005 | Petry et al. |
| 6,944,616 B2 | 9/2005 | Ferguson et al. |
| 6,963,929 B1 | 11/2005 | Lee |
| 7,016,939 B1 | 3/2006 | Rothwell et al. |
| 7,020,642 B2 | 3/2006 | Ferguson et al. |
| 7,051,077 B2 | 5/2006 | Lin |
| 7,062,498 B2 | 6/2006 | Al-Kofahi et al. |
| 7,072,942 B2 | 7/2006 | Maller |
| 7,089,241 B1 | 8/2006 | Alspector et al. |
| 7,107,254 B1 | 9/2006 | Dumais et al. |
| 7,133,660 B2 | 11/2006 | Irlam et al. |
| 7,145,875 B2 | 12/2006 | Allison et al. |
| 7,178,030 B2 * | 2/2007 | Scheidt et al. ................ 713/176 |
| 7,181,764 B2 | 2/2007 | Zhu et al. |
| 7,219,148 B2 | 5/2007 | Rounthwaite et al. |
| 7,266,508 B1 | 9/2007 | Owen et al. |
| 7,287,060 B1 | 10/2007 | McCown et al. |
| 7,320,020 B2 | 1/2008 | Chadwick et al. |
| 7,360,165 B2 * | 4/2008 | Cortright et al. .............. 715/752 |
| 7,401,148 B2 | 7/2008 | Lewis |
| 7,428,410 B2 | 9/2008 | Petry et al. |
| 7,472,422 B1 | 12/2008 | Agbabian |
| 7,506,155 B1 | 3/2009 | Stewart et al. |
| 7,596,600 B2 | 9/2009 | Quine et al. |
| 7,610,344 B2 | 10/2009 | Mehr et al. |
| 7,657,935 B2 | 2/2010 | Stolfo et al. |
| 7,680,890 B1 | 3/2010 | Lin |
| 7,870,240 B1 | 1/2011 | Horvitz et al. |
| 7,953,814 B1 | 5/2011 | Chasin et al. |
| 7,970,832 B2 | 6/2011 | Perry et al. |
| 8,363,793 B2 | 1/2013 | Chasin et al. |
| 8,484,295 B2 | 7/2013 | Chasin et al. |
| 8,531,414 B2 | 9/2013 | Huibers |
| 8,738,708 B2 | 5/2014 | Chasin |
| 2002/0007453 A1 | 1/2002 | Nemovicher |
| 2002/0120697 A1 | 8/2002 | Generous et al. |
| 2002/0188863 A1 | 12/2002 | Friedman |
| 2002/0199095 A1 | 12/2002 | Bandini et al. |
| 2003/0009698 A1 | 1/2003 | Lindeman et al. |
| 2003/0023736 A1 | 1/2003 | Abkemeier |
| 2003/0061506 A1 | 3/2003 | Cooper et al. |
| 2003/0074413 A1 | 4/2003 | Nielsen et al. |
| 2003/0101181 A1 | 5/2003 | Al-Kofahi et al. |
| 2003/0158905 A1 | 8/2003 | Petry et al. |
| 2003/0167402 A1 | 9/2003 | Stolfo et al. |
| 2003/0172294 A1 | 9/2003 | Judge |
| 2003/0177387 A1 | 9/2003 | Osterwalder et al. |
| 2003/0187937 A1 | 10/2003 | Yao et al. |
| 2003/0187942 A1 | 10/2003 | Quine et al. |
| 2003/0212546 A1 | 11/2003 | Shaw |
| 2003/0220978 A1 | 11/2003 | Rhodes |
| 2003/0236835 A1 | 12/2003 | Levi et al. |
| 2003/0236847 A1 | 12/2003 | Benowitz et al. |
| 2004/0058673 A1 | 3/2004 | Irlam et al. |
| 2004/0078334 A1 | 4/2004 | Malcolm et al. |
| 2004/0088369 A1 | 5/2004 | Yeager et al. |
| 2004/0088551 A1 * | 5/2004 | Dor et al. ...................... 713/182 |
| 2004/0177110 A1 | 9/2004 | Rounthwaite et al. |
| 2004/0177120 A1 | 9/2004 | Kirsch |
| 2004/0177271 A1 | 9/2004 | Arnold et al. |
| 2004/0199597 A1 | 10/2004 | Libbey et al. |
| 2004/0267893 A1 | 12/2004 | Lin |
| 2005/0010644 A1 | 1/2005 | Brown et al. |
| 2005/0015626 A1 | 1/2005 | Chasin |
| 2005/0021649 A1 | 1/2005 | Goodman et al. |
| 2005/0044153 A1 | 2/2005 | Gross |
| 2005/0044170 A1 | 2/2005 | Cox et al. |
| 2005/0063365 A1 | 3/2005 | Mathew et al. |
| 2005/0064850 A1 | 3/2005 | Irlam et al. |
| 2005/0076084 A1 | 4/2005 | Loughmiller et al. |
| 2005/0080816 A1 | 4/2005 | Shipp |

(56) References Cited

U.S. PATENT DOCUMENTS

| | | | |
|---|---|---|---|
| 2005/0081059 | A1 | 4/2005 | Bandini et al. |
| 2005/0091272 | A1 | 4/2005 | Smith et al. |
| 2005/0125667 | A1 | 6/2005 | Sullivan et al. |
| 2005/0149747 | A1 | 7/2005 | Wesinger et al. |
| 2005/0182959 | A1 | 8/2005 | Petry et al. |
| 2005/0182960 | A1 | 8/2005 | Petry et al. |
| 2005/0198159 | A1 | 9/2005 | Kirsch |
| 2005/0198182 | A1 | 9/2005 | Prakash et al. |
| 2005/0240617 | A1 | 10/2005 | Lund et al. |
| 2005/0259667 | A1 | 11/2005 | Vonokurov et al. |
| 2005/0266832 | A1 | 12/2005 | Irlam et al. |
| 2006/0015726 | A1 | 1/2006 | Callas |
| 2006/0031483 | A1 | 2/2006 | Lund et al. |
| 2006/0039540 | A1* | 2/2006 | Issinski ............... 379/45 |
| 2006/0047766 | A1 | 3/2006 | Spadea |
| 2006/0075497 | A1 | 4/2006 | Garg et al. |
| 2006/0080432 | A1 | 4/2006 | Spataro et al. |
| 2006/0080613 | A1 | 4/2006 | Savant |
| 2006/0095524 | A1 | 5/2006 | Kay et al. |
| 2006/0149823 | A1 | 7/2006 | Owen et al. |
| 2006/0168006 | A1 | 7/2006 | Shannon et al. |
| 2006/0168024 | A1 | 7/2006 | Mehr et al. |
| 2006/0168057 | A1 | 7/2006 | Warren et al. |
| 2006/0277220 | A1 | 12/2006 | Patrick et al. |
| 2006/0277597 | A1 | 12/2006 | Dreymann |
| 2007/0008987 | A1 | 1/2007 | Manion et al. |
| 2007/0044152 | A1 | 2/2007 | Newman et al. |
| 2007/0067392 | A1 | 3/2007 | Torres et al. |
| 2007/0100949 | A1 | 5/2007 | Hulten et al. |
| 2007/0106698 | A1 | 5/2007 | Elliott et al. |
| 2007/0107059 | A1 | 5/2007 | Chasin et al. |
| 2007/0214227 | A1 | 9/2007 | Quinn |
| 2007/0244974 | A1 | 10/2007 | Chasin |
| 2008/0294726 | A1 | 11/2008 | Sidman |
| 2010/0030858 | A1 | 2/2010 | Chasin |
| 2011/0187652 | A1 | 8/2011 | Huibers |
| 2011/0191438 | A1 | 8/2011 | Huibers et al. |
| 2011/0191823 | A1 | 8/2011 | Huibers |
| 2011/0197275 | A1 | 8/2011 | Chasin et al. |
| 2013/0041955 | A1 | 2/2013 | Chasin et al. |
| 2013/0117397 | A1 | 5/2013 | Chasin et al. |
| 2013/0130714 | A1 | 5/2013 | Huibers et al. |
| 2013/0217335 | A1 | 8/2013 | Huibers et al. |
| 2013/0326622 | A9 | 12/2013 | Chasin et al. |
| 2014/0141818 | A1* | 5/2014 | Yoakum ................ 455/466 |

FOREIGN PATENT DOCUMENTS

| | | |
|---|---|---|
| JP | 2004-287790 | 10/2004 |
| JP | 2009515426 | 4/2009 |
| WO | WO 2005/006139 | 1/2005 |
| WO | WO 2005/010692 | 2/2005 |
| WO | WO 2007/055770 | 5/2007 |

OTHER PUBLICATIONS

Non-Final Office Action mailed Sep. 22, 2008 in U.S. Appl. No. 10/888,370, filed Jul. 9, 2004, by C. Scott Chasin.
Final Office Action mailed Jan. 16, 2008 in U.S. Appl. No. 10/888,370, filed Jul. 9, 2004, by C. Scott Chasin.
Non-Final Office Action mailed Jul. 31, 2007 in U.S. Appl. No. 10/888,370, filed Jul. 9, 2004, by C. Scott Chasin.
Non-Final Office Action mailed Oct. 6, 2008 in U.S. Appl. No. 11/394,890, filed Mar. 31, 2006, by Wei Lin.
Final Office Action mailed Apr. 27, 2009 in U.S. Appl. No. 11/315,480, filed Dec. 21, 2005, by C. Scott Chasin.
Non-Final Office Action mailed Sep. 17, 2008 in U.S. Appl. No. 11/315,480, filed Dec. 21, 2005, by C. Scott Chasin.
Non-Final Office Action mailed May 11, 2009 in U.S. Appl. No. 11/537,432, filed Sep. 29, 2006, by C. Scott Chasin.
Woitaszek, M.; Shaaban, M.; Czernikowski, R., "Identifying junk electronic mail in Microsoft outlook with a support vector machine," Proceedings of the 2003 Symposium on Application and the Internet, Jan. 2003.
International Preliminary Report on Patentability and Written Opinion of the International Search Authority for PCT/US2006/32402, International Searching Authority, Mar. 24, 2009.
International Search Report for PCT/US2006/32402, International Searching Authority, Mar. 25, 2008.
International Search Report mailed Aug. 4, 2006 (2 pages), International Preliminary Report on Patentability issued Oct. 3, 2006 (1 page), and Written Opinion of the International Searching Authority mailed Aug. 4, 2006 (3 pages) for International Application No. PCT/US04/20899.
International Search Report mailed Dec. 2, 2009 (1 page), International Preliminary Report on Patentability issued Feb. 17, 2009 (1 page), and Written Opinion of the International Searching Authority mailed Dec. 2, 2009 (5 pages), for International Application No. PCT/US04/22846.
U.S. Appl. No. 11/365,130, filed Feb. 28, 2006.
U.S. Appl. No. 11/315,480, filed Dec. 21, 2005.
U.S. Appl. No. 11/394,890, filed Mar. 31, 2006.
U.S. Appl. No. 11/465,433, filed Aug. 17, 2006.
U.S. Appl. No. 11/537,432, filed Sep. 29, 2006.
U.S. Appl. No. 60/886,898, filed Jan. 26, 2007.
"Allegro Mailzone Filters Junk E-Mail," Law Technology Product News, vol. 6, Issue 3, Mar. 1999, available at www.webarchive.org, downloaded Apr. 29, 2006 (1 page).
"Allegro messaging company has protected 1,000 businesses from viruses," Dayton Business Journal, Jun. 11, 1999, available at www.dayton.biziomals.com, downloaded Apr. 29, 2006 (3 pages).
"Allegro's Mailzone Blocks Illegal MP3 Files," Allegro.net press release, Jul. 14, 1999, available at www.webarchive.org, downloaded Apr. 29, 2006 (2 pages).
"Allegro's Mailzone Stops Back Orifice 2000," Allegro.net press release Jul. 14, 1999, available at www.webarchive.org, downloaded Apr. 29, 2006 (2 pages).
"Allegro's Mailzone Stops Back Orifice 2000," Allegro.net press release, Jul. 15, 1999, available at www.webarchive.org, downloaded Apr. 29, 2006 (2 pages).
"Allegro's Mailzone Stops 'Worm' While on the Net," Allegro.net press release, Jun. 10, 1999, available at www.webarchive.org, downloaded Apr. 29, 2006 (2 pages).
"Allegro's Richard Bliss to speak at upcoming 'E-mail Outsourcing' conference," Allegro.net press release, Jun. 2, 1999, available at www.webarchive.org, downloaded Apr. 29, 2006 (1 page).
"Phantom Menace a real menace to network administrators," Allegro.net press release, Apr. 28, 1999, available at www.webarchive.org, downloaded Apr. 29, 2006 (2 pages).
Bhattacharyya, Manasi, et al., research paper, "MET: An Experimental System for Malicious Email Tracking," Columbia University and Cornell University, published 2002 (11 pages).
Corporate Factsheet 2005,Clearswift Ltd., downloaded Nov. 6, 2005 (12 pages).
Graham, Better Bayesian Filtering, Jan. 2003 (12 pages).
Gupta, A., et al., research paper, "An Approach for Detecting Self-Propagating Email Using Anamoly Detection," Department of Computer Science, Stony Brook University, published 2003 (18 pages).
Lindberg, G., RFC 2505—Anti-Spam Recommendations for SMTP MTAs, The Internet Society, Feb. 1999, available at http://www.fags.org/rfcs/rfc2505.html, downloaded Nov. 6, 2005 (19 pages).
Listsery 14.5 @ Miami University, "Allegro Mailzone Filters Unwanted E-mail," Jan. 25, 1999, available at www.listserv.muohio.edu, downloaded Apr. 29, 2006 (6 pages).
M. Sahami, S. Dumais, D. Heckerman, and E. Horvitz, "A Bayesian approach to filtering junk e-mail", In Learning for Text Categorization—Papers from the AAAI Workshop, pp. 55-62, Madison, Wisconsin, 1998 (8 pages).
Mail Abuse Prevention System, LLC, Basic Mailing List Management Guidelines for Preventing Abuse, available at http://web.archive.org/web/20010309004654/maps.vix.com/manage.html, downloaded Nov. 6, 2005 (3 pages).
Mailzone—Message Management Services—Mail Watch Next Generation, Web Site, available at www.webarchive.org, downloaded Apr. 29, 2006 (22 pages).

(56) References Cited

OTHER PUBLICATIONS

McNamara, Paul, "Take my apps—please," NetworkWorld, May 31, 1999, available at www.networkworld.com, downloaded Apr. 29, 2006 (7 pages).
Nonfinal Office Action mailed Aug. 4, 2009 in U.S. Appl. No. 11/365,130, filed Feb. 28, 2006 (10 pages).
Postfix.org web site, available at http://www.postfix.org, downloaded Nov. 6, 2005 (251 pages).
Sendmail, Inc., Sendmail.org home page, available at http://www.sendmail.org/, downloaded Nov. 6, 2005 (110 pages).
Sergeant, Internet Level Spam Detection and SpamAssassin 2.50, MessageLabs, http://spamassassin.apache.org/presentations/SpamConf2003.pdf, 2003 (21 pages).
Stolfo, Salvatore J., et al., research paper, "Combining Behavior Models to Secure E-Mail Systems," Columbia University, May 16, 2003 (14 pages).
Stolfo, Salvatore J., et al.,research paper, "Detecting Viral Propagations Using Email Behavior Profiles," Columbia University, 2003 (47 pages).
Thyfault, Mary E., "Companies choose outside e-mail services for cost, functionality, and easy administration," Information Week, Aug. 2, 1999, available at www.informationweek.com, downloaded Apr. 29, 2006 (5 pages).
Peer-to-Peer (P2P) Roadmpa; Website: http://msdn2.microsoft.com/en-us/library/bb756997(printer).aspx, date retrieved Feb. 1, 2008, 4 pages.
People Near Me; Microsoft TechNet, Website: http://technet.microsoft.com/en-us/library/bb726969(printer).aspx, published Sep. 27, 2006, date retrieved Feb. 1, 2008, 6 pages.
Zachariassen, Rayan, Zmailer The Manual, v. 1.99.26.200602020935, available at http://www.smailer.org/zman/zmanual.shtml, downloaded Apr. 28, 2006 (312 pages).
Miyake et al., "A Method to Detect Unknown Computer Virus Using Virtual Server,", Technical Report of Information Processing Society of Japan, 2002-CSEC-18, Jul. 19, 2002.
Yoshimi et al., "Proposal of Nat/Proxy Traversing Remote Access Technology," Technical Report of the Institute of Electronics, Information and Communication Engineers, NS2005-84, Sep. 8, 2005.
Takata, Manabu "Servey [sic] & Choice, Mail Filtering Software—Excellently High Degree of Freedom in Setting Up—Applicability to Coded Emails Starting," Nikkei Communications, No. 302, Sep. 20, 1999, pp. 121-127.
PCT International Preliminary Report on Patentability in PCT International Application No. PCT/US04/20899 mailed on Oct. 3, 2006.
PCT International Search Report and Written Opinion in PCT International Application No. PCT/US04/22846 mailed on Dec. 2, 2005.
PCT International Preliminary Report on Patentability in PCT International Application No. PCT/US04/22846 mailed on Feb. 17, 2009.
PCT International Search Report and Written Opinion in PCT International Application Serial No. PCT/US2006/32402 mailed on Mar. 25, 2008.
PCT International Preliminary Report on Patentability in PCT International Application Serial No. PCT/US2006/32402 mailed on Mar. 24, 2009.
European Patent Office Extended Search Report, Search Opinion, and Examiner's Preliminary Opinion in EPO Patent Application Serial No. 06789864.3—1244 mailed on Feb. 16, 2012.
European Patent Office Communication Pursuant to Article 94(3) EPC (Examination Report) in EP Application Serial No. 06789864.3 mailed on Aug. 16, 2013.
Japan Patent Office First Office Action in Japanese Patent Application No. 2008-538876 mailed on Apr. 18, 2011.
Japan Patent Office Final Office Action for Japanese Patent Application No. 2008-538876 mailed on Aug. 30, 2011.
Japan Patent Office Final Refusal in Japanese Patent Application Serial No. 2008-538876 mailed on Dec. 13, 2011.
Notice of Allowance in U.S. Appl. No. 10/873,882 mailed on Jan. 3, 2006.
Advisory Action in U.S. Appl. No. 10/888,370 mailed on Apr. 11, 2008.
C16, Examiner's Answer to Appeal Brief in U.S. Appl. No. 10/888,370 mailed on Mar. 31, 2010.
Board of Patent Appeals Decision in U.S. Appl. No. 10/888,370 mailed on Jun. 4, 2013.
Non-Final Office Action in U.S. Appl. No. 11/365,130 mailed on Aug. 4, 2009.
Final Office Action in U.S. Appl. No. 11/365,130 mailed on Mar. 18, 2010.
Non-Final Office Action in U.S. Appl. No. 11/365,130 mailed on Oct. 6, 2010.
Notice of Allowance in U.S. Appl. No. 11/365,130 mailed on Jan. 27, 2011.
Notice of Allowance in U.S. Appl. No. 11/365,130 mailed on Feb. 10, 2011.
Notice of Allowance in U.S. Appl. No. 11/365,130 mailed on Mar. 29, 2011.
Non-Final Office Action in U.S. Appl. No. 13/091,011 mailed on May 9, 2012.
Notice of Allowance in U.S. Appl. No. 13/091,011 mailed on Aug. 17, 2012.
Corrected Notice of Allowance in U.S. Appl. No. 13/091,011 mailed on Oct. 2, 2012.
U.S. Appl. No. 13/726,607, filed on Dec. 25, 2012, and entitled "Stopping and Remediating Outbound Messaging Abuse," Inventors C. Scott Chasin, et al.
Non-Final Office Action in U.S. Appl. No. 13/726,607 mailed on Apr. 24, 2014.
Final Office Action in U.S. Appl. No. 13/726,607 mailed on Aug. 28, 2014.
Non-Final Office Action in U.S. Appl. No. 11/315,480 mailed on Jan. 21, 2010.
Final Office Action in U.S. Appl. No. 11/315,480 mailed on Jul. 9, 2010.
Advisory Action in U.S. Appl. No. 11/315,480 mailed on Sep. 24, 2010.
Non-Final Office Action in U.S. Appl. No. 11/315,480 mailed on Oct. 17, 2012.
Notice of Allowance in U.S. Appl. No. 11/315,480 mailed on Feb. 5, 2013.
Notice of Allowance in U.S. Appl. No. 11/394,890 mailed on Jun. 26, 2009.
Notice of Allowance in U.S. Appl. No. 11/394,890 mailed on Oct. 29, 2009.
Non-Final Office Action in U.S. Appl. No. 11/465,433 mailed on Oct. 6, 2009.
Final Office Action in U.S. Appl. No. 11/465,433 mailed on Apr. 28, 2010.
Non-Final Office Action in U.S. Appl. No. 11/465,433 mailed on Dec. 7, 2012.
Final Office Action in U.S. Appl. No. 11/465,433 mailed on Nov. 8, 2013.
Non-Final Office Action in U.S. Appl. No. 11/537,432 mailed on May 11, 2009.
Final Office Action in U.S. Appl. No. 11/537,432 mailed on Jan. 27, 2010.
Notice of Allowance in U.S. Appl. No. 11/537,432 mailed on Feb. 10, 2012.
Notice of Allowance in U.S. Appl. No. 11/537,432 mailed on Aug. 3, 2012.
Corrected Notice of Allowability in U.S. Appl. No. 11/537,432 mailed on Aug. 16, 2012.
Notice of Allowance in U.S. Appl. No. 11/537,432 mailed on Nov. 30, 2012.
Ex Parte Quayle Action in U.S. Appl. No. 11/537,432 mailed on Oct. 2, 2013.
Notice of Allowance in U.S. Appl. No. 11/537,432 mailed on Feb. 3, 2014.
Non-Final Office Action in U.S. Appl. No. 12/185,517 mailed on Sep. 1, 2010.
Final Office Action in U.S. Appl. No. 12/185,517 mailed on Mar. 4, 2011.
Advisory Action in U.S. Appl. No. 12/185,517 mailed on Jun. 29, 2011.

(56) References Cited

OTHER PUBLICATIONS

Examiner's Answer to Appeal Brief in U.S. Appl. No. 12/185,517 mailed on Sep. 1, 2012.
Board of Patent of Appeals Decision in U.S. Appl. No. 12/185,517 mailed on Oct. 31, 2014.
Non-Final Office Action in U.S. Appl. No. 13/726,607 mailed on Feb. 11, 2015.
"ActivIdentity Technology Brief, Solutions for Strong Authentication" ActivIdentity, Copyright 2007 (2 pages).
"Actividentity Technology Brief, Device and Credential Management," ActivIdentity, Copyright 2006 (2 pages).
"Device and Credential Management Solutions", ActivIdentity, www.actividentity.com, Jul. 3, 2007 (2 pages).
"Actividentity, Technology Brief, Secure Information and Transactions", ActivIdentity, Copyright 2006 (2 pages).
"ActivIdentity, Technology Brief, Enterprise Single Sign-On," Copyright 2006 (2 pages).
"Strong Authentication Solutions", ActivIdentity, www.actividentity.com, Jul. 4, 2007.
Rodger, Allan, "Technology Audit, Security, ActivIdentity Smart Employee ID," Butler Group Subscription Services, TA00011173SEC, Jan. 2007 (8 pages).
Hudson, Sally, "White Paper—ActivIdentity: Digital Proof of Identity for Evolving Ecosystems," IDC sponsored by ActivIdentity, Oct. 2006 (13 pages).
"Apply for the Bump API now!", Bump Technologies, Inc., www.bu.mp, Dec. 25, 2009 (2 pages).
"Frequently Asked Questions", Bump Technogies, Inc., www.bu.mp, Dec. 26, 2009 (2 pages).
Kincaid, Jason, "Bump Shares Its Phone Tapping, Data Swapping Technology with New API", TechCrunch, Dec. 22, 2009 (1 page).
Kincaid, Jason, "Bump Goes Cross-Platform with New Android App; Upgrades iPhone Version Too", TechCrunch, Nov. 11, 2009 (1 page).
"Bump Technologies, for iPhone, Android", Bump Technologies, Inc., www.bu.mp, May 22, 2010 (1 page).
Webpage, Products, Ping Identity Corporation, www.pingidentity.com, Dec. 13, 2002 (1 page).
"PingID Network Provides Enterprises with Complete Business Framework for Inter-Company Identity Management," Ping Identity Corporation, www.pingidentity.com, Jan. 28, 2003 (2 pages).
"PingID, Addressing Identity Fraud," Ping Identity Corporation, Mar. 16, 2013 (15 pages).
"Ping Identity Releases SourcID SSO, an Open Source, Liberty Complaint Toolkit for Federated Identity and Single Sing-On," Ping Identity Corporation, Jan. 20, 2003 (2 pages).
Norlin et al., "Federated Identity Management, Corporate Strategies for Managing Security, Liability, Scalability and the Risk of Fraud as Identity Moves Toward Federation," PingID, www.pingidentity.com, Copyright 2003 (12 pages).
"Federation Primer, Digital Identity Basics," PingIdentity Corporation, Copyright 2004 (6 pages).
Elliot, et a., "Scenarios for Identity Federation and Drivers of the Identity Network," Ping Identity Corporation and Nokio Innovent, Copyright 2004 (24 pages).
"White Paper, 5 Steps to Secure Internet SSO," PingIdentity Corporation, Copyright 2008 (6 pages).
"iKey 1000 Two-Factor Authentication for Your Digital Identity," SafeNet, Inc., www.safenet-inc.com, Feb. 13, 2005 (2 pages).
"SafeNet VPN Solutions," SafeNet, Inc., www.safenet-inc.com, Feb. 13, 2005 (2 pages).
"An IPSec CPN Gateway with GigaBit Performance, Low Latency, and Tigh Throughput", SafeNet, Inc., www.safenet-inc.com, Feb. 13, 2005.
"Efficient Cryptographic Association," SafeNet, Inc., www.safenet-inc.com, Dec. 12, 2004 (1 page).
"iKey 1000, Workstation Security and Secure Remote Access," SafeNet, Inc., Copyright 2004 (2 pages).
"Welcome to SafeNet, Inc.'s Online Store for SafeNet Products", SafeNet, Inc. www.soft-pk.com, Nov. 17, 2000 (3 pages).
"SSL-Based Remote Access," SafeNet, Inc. www-safenet-inc.com, Mar. 5, 2005 (2 pages).
"SafeEnterprise SSL iGate", SafeNet, Inc., Copyright 2005 (2 pages).
"DocuSign Express, Features and Benefits", DocuSign, Inc., www.docusign.com, Jun. 16, 2004 (2 pages).
"DocuSign Express makes it Easy and Fast," DocuSign, Inc., www.docusign.com, Jul. 11, 2004 (3 pages).
"New Norton Anti-theft to Protect Lost or Stolen Laptops, Smartphones and Tablets", Symantec Corporation, Oct. 4, 2011 (6 pages).

\* cited by examiner

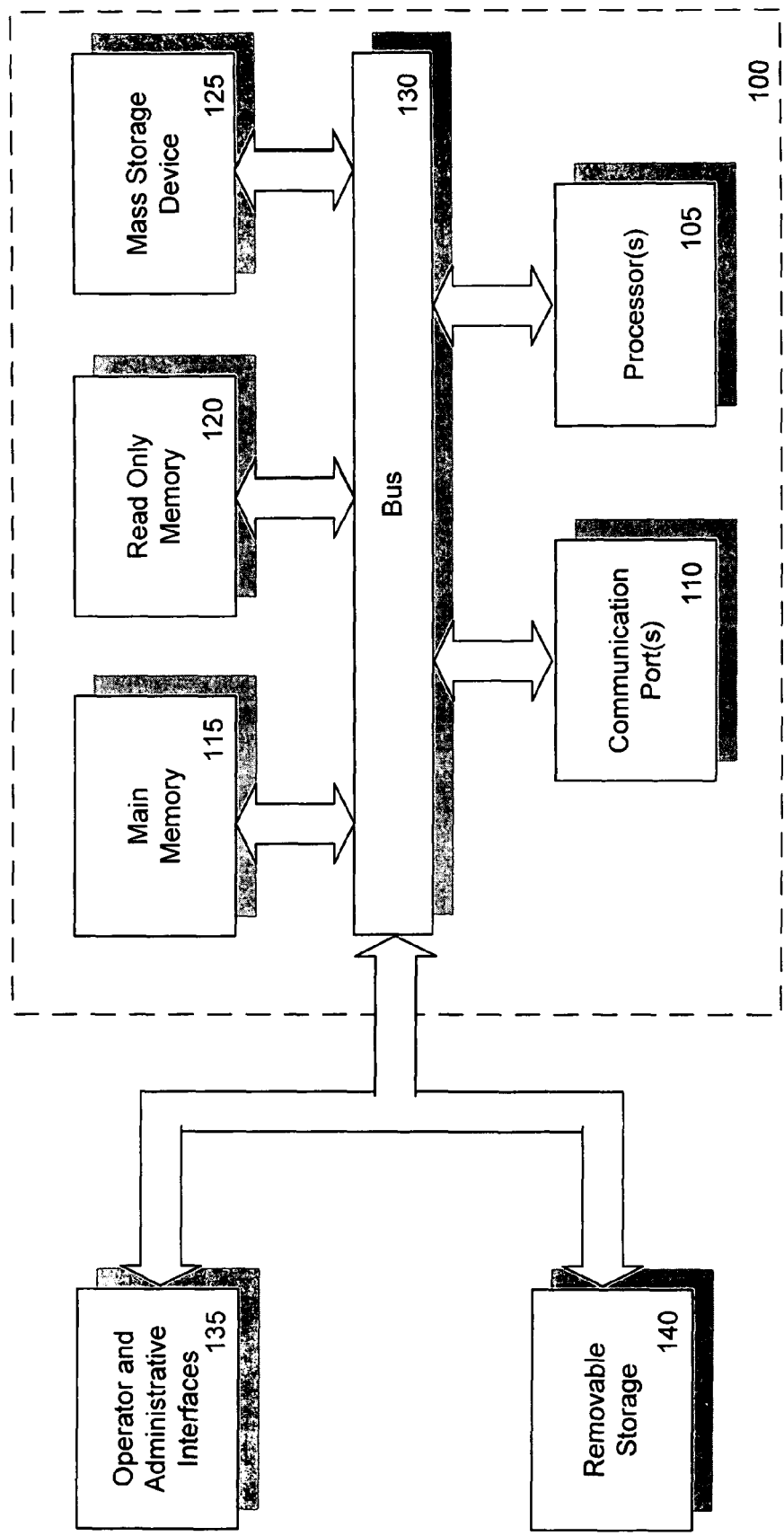

MARKING ELECTRONIC MESSAGES TO INDICATE HUMAN ORIGINATION

CROSS-REFERENCE TO RELATED APPLICATIONS

This application claims the benefit of U.S. Provisional Application No. 60/660,311, filed on Mar. 10, 2005, which is hereby incorporated by reference for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2005-2006 MX Logic, Inc.

BACKGROUND

1. Field

Embodiments of the present invention generally relate to systems and methods for spam and email management. More specifically, embodiments of the present invention provide for systems and methods of marking an electronic message to indicate the electronic message originated from a human sender.

2. Description of Related Art

At present, email cannot be sorted, managed or filtered based on the fact that messages were originated by a human rather than a machine.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIG. 1 illustrates an example of a computer system with which embodiments of the present invention may be utilized.

DETAILED DESCRIPTION

Systems and methods are described for marking electronic messages to indicate human origination. According to one embodiment, information is associated with an electronic message to reliably indicate to recipients of the message that the message is of human rather than machine origination.

In the following description, for the purposes of explanation, numerous specific details are set forth in order to provide a thorough understanding of embodiments of the present invention. It will be apparent, however, to one skilled in the art that embodiments of the present invention may be practiced without some of these specific details.

Embodiments of the present invention may be provided as a computer program product which may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

While, for convenience, various embodiments of the present invention may be described with reference to email messages, the present invention is equally applicable to various other forms of electronic messaging, such as instant messages, mobile messages (e.g., SMS, MMS), voice mail and the like.

For the sake of illustration, various embodiments of the present invention are described herein in the context of computer programs, physical components, and logical interactions within modern computer networks. Importantly, while these embodiments describe various aspects of the invention in relation to modem computer networks and programs, the method and apparatus described herein are equally applicable to other systems, devices, and networks as one skilled in the art will appreciate. As such, the illustrated applications of the embodiments of the present invention are not meant to be limiting, but instead exemplary. Other systems, devices, and networks to which embodiments of the present invention are applicable include, but are not limited to, cellular phones, personal digital assistants (PDAs), pagers, BlackBerry® devices and the like.

Terminology

Brief definitions of terms, abbreviations, and phrases used throughout this application are given below.

The term "biomark" generally refers to an indicator that may be associated with an electronic message to indicate human origination of the message as opposed to machine origination as verified by a biometric device. Biomarks may be generated by an email user's Mail User Agent (MUA) based upon the output of biometric devices, such as fingerprint readers, hand scanners, retina or iris scanners, voice or face recognition/verification system, and the like. In one embodiment, biomarks may be associated with an email message by placing a human origination indicator within a header, such as a proprietary X-header or a standard "Biomark:" header. According to one embodiment, biomarks may be wrapped in digital signatures that include the originating timestamp and other message attributes. In one embodiment, biomarks may, but need not represent personal identity information.

The terms "connected" or "coupled" and related terms are used in an operational sense and not necessarily limited to a direct physical connection or coupling. Thus, for example, two devices may be coupled directly, or via one or more intermediary media or devices. As another example, devices may be coupled in such a way that information can be passed there between, while not sharing any physical connection one with another. Based on the disclosure provided herein, one of ordinary skill in the art will appreciate a variety of ways in which connection or coupling exists in accordance with the aforementioned definition.

The phrase "human origination indication" or "human origination marker" generally refers to an indicator that may be associated with an electronic message to indicate human origination of the message as opposed to machine origination. Human origination indications include biomarks and may be generated by an email user's Mail User Agent (MUA) based upon the detection and/or output of one or more physical presence indicating mechanisms, such as smart cards, signature verification systems, magnetic keycards, security tokens, access-control devices, verification tests (such as visual or auditory test that may require a human operator to type into a Web form a few characters that appear on the form in a guise that prevents a computer or software robot from recognizing and copying them), electric field (EF) sensing devices, ultrasonic sensing devices, optoelectronic sensing (e.g., video or other optical sensing) devices, temperature sensing devices, systems based on reflection, infrared, microwave, pyroelectric systems, laser, inductive, or triboelectric sensing and the like either incorporated or otherwise integrated with a computer peripheral device or as a standalone device, and the like. In one embodiment, human origination indications may be associated with an email message by placing information within a header, such as a proprietary X-header or a standard "Human Origination:" header. According to one embodiment, human origination markers may be wrapped in digital signatures that include the originating timestamp and other message attributes.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phrases do not necessarily refer to the same embodiment.

The phrase "Internet service provider" or "ISP" generally refers to a service provider or other organization that provides access to the Internet. ISPs may provide service via modem, ISDN, cable, DSL or the like and may also offer private line hookups (e.g., T1, fractional T1, etc.). As used herein, the term ISP is intended to encompass online services, such as America Online and CompuServe, that provide members with Internet access as well as members only content, forums and services. While ISPs are typically fee-based companies that provide third party subscribers or members with "dial-up" or direct access to the Internet via SLP, PPP, or TCP/IP, as used herein the term ISP is also intended to encompass companies in their role as employers supplying Internet access to employees and/or contractors. Therefore, for purposes of this application, an enterprise supplying email accounts to its employees acts as an ISP and the employees would be considered subscribers of the ISP.

If the specification states a component or feature "may", "can", "could", or "might" be included or have a characteristic, that particular component or feature is not required to be included or have the characteristic.

The term "responsive" includes completely or partially responsive.

The phrase "service provider" generally refers to a company that provides users with services and/or subscriptions to a messaging network, such as the Internet, a wireless network, a mobile phone network and/or the like. As used herein, the phrase "service provider" is intended to encompass not only companies, such as ISPs, wireless operators, carriers and the like, that may provide access to messaging networks for a fee, but additionally is intended to encompass companies acting in their capacities as employers providing their employees and/or contractors with access to messaging networks. Consequently, for purposes of this application, an enterprise supplying email, voice, voice mail, mobile phone, text messaging and/or other messaging services to its employees and/or contractors acts as a service provider with respect to such employees and/or contractors and such employees and/or contractors would be considered subscribers of the service provider.

The term "subscriber" generally refers to an individual or company that is a user of services provided by a service provider. For purposes of clarity, in addition to covering the traditional notion of a subscriber as an individual or company that pays a fee for use and/or access to services provided by the service provider, as used herein, the term subscriber is intended to encompass employees, consultants, contractors and/or the like that are provided with services (e.g., email, voice, voice mail, mobile phone, wireless, text messaging and/or other messaging accounts) by virtue of their relationship with an employer or company.

Exemplary Computer System Overview

Embodiments of the present invention include various steps, which will be described in more detail below. A variety of these steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 1 is an example of a computer system 100, such as a workstation, personal computer, client, server, or gateway, upon which or with which embodiments of the present invention may be utilized.

According to the present example, the computer system includes a bus 130, at least one processor 105, at least one communication port 110, a main memory 104, a removable storage media 140 a read only memory 120, and a mass storage 125.

Processor(s) 105 can be any known processor, such as, but not limited to, an Intel® Itanium® or Itanium 2 processor(s), or AMD® Opteron® or Athlon MP® processor(s), or Motorola® lines of processors. Communication port(s) 110 can be any of an RS-232 port for use with a modem based dialup connection, a 10/100 Ethernet port, or a Gigabit port using copper or fiber. Communication port(s) 110 may be chosen depending on a network such a Local Area Network (LAN), Wide Area Network (WAN), or any network to which the computer system 100 connects.

Main memory 104 can be Random Access Memory (RAM), or any other dynamic storage device(s) commonly known in the art. Read only memory 120 can be any static storage device(s) such as Programmable Read Only Memory (PROM) chips for storing static information such as instructions for processor 105.

Mass storage 125 can be used to store information and instructions. For example, hard disks such as the Adaptec® family of SCSI drives, an optical disc, an array of disks such as RAID, such as the Adaptec family of RAID drives, or any other mass storage devices may be used.

Bus 130 communicatively couples processor(s) 105 with the other memory, storage and communication blocks. Bus 130 can be a PCI/PCI-X or SCSI based system bus depending on the storage devices used.

Optionally, operator and administrative interfaces 135, such as a display, keyboard, and a cursor control device, may also be coupled to bus 130 to support direct operator interaction with computer system 100. Other operator and administrative interfaces can be provided through network connections connected through communication ports 110.

Optionally, one or more physical presence verification devices, such as smart card readers, signature verification systems, magnetic keycard readers, security token readers, other access-control devices, peripheral devices incorporating or standalone devices performing electric field (EF) sensing, ultrasonic sensing, optoelectronic sensing (e.g., video or other optical sensing), temperature sensing, sensing based on reflection, infrared, microwave, and/or the like, may also be coupled to bus 130 or communications ports 110 to support human origination verification of electronic messages originated by computer system 100 or one or more associated computer systems.

Optionally, one or more biometric devices, such as fingerprint readers, hand scanners, retina or iris scanners, voice or face recognition/verification system, or the like, may also be coupled to bus 130 or communications ports 110 to support human origination verification of electronic messages originated by computer system 100 or one or more associated computer systems.

Removable storage media 140 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

The components described above are meant to exemplify some types of possibilities. In no way should the aforementioned examples limit the scope of the invention, as they are only exemplary embodiments.

Embodiments of the present invention provide novel systems and methods for marking electronic messages to indicate human origination. A standard relating to marking electronic messages to indicate human origin by way of biomarking, for example, is anticipated to provide new capabilities in spam and email management within each layer of the messaging ecosystem. For example, a message that is biomarked will provide new opportunities in email sorting and classification that will benefit message filtering and storage infrastructure as well as mailbox presentation to the end user. According to one embodiment, email end users will be able to quickly view human originated email by way of segmented folders or sorting preferences.

What is claimed is:

1. A computerized method, implemented on a computer system, for conveying human origination of an electronic message to at least one recipient comprising:
    coupling at least one physical presence indicating mechanism to said computer system having a memory and a central processing unit (CPU) to perform processes for conveying human origination;
    determining by said computer system that said message is human originated if output of said at least one physical presence indicating mechanism indicates a physical presence, wherein a biomark is used in assisting in the determining whether the message is human originated, and wherein the biomark is associated with a unique physical characteristic of an end user that originated the message;
    marking said electronic message with a human origination indication containing information verifying that said electronic message is human originated if said electronic message was determined to be human originated by said computer system, wherein the human origination indication containing information is wrapped in a first digital signature that is included in the electronic message and that reflects an originating timestamp, and wherein the electronic message includes a second digital signature reflecting the biomark being associated with personal identity information;
    receiving said electronic message and said human origination indication containing said information verifying said electronic message is human originated by at least one recipient; and
    conveying to said at least one recipient of said electronic message that said electronic message is human originated by said human origination indication of said electronic message.

2. The computerized method of claim 1 wherein said at least one physical presence indicating mechanism is comprised of at least one of a group comprising: a physical presence verification device, a biometric device, a smart card reader, a signature verification system, a magnetic keycard reader, a security token reader, an access-control device, a verification test system, a verification test system incorporating a visual test requiring a human operator to type in a few characters that appear in a form that prevents a computer/software robot from recognizing said few characters, a verification test system incorporating an auditory test requiring a human operator to type in a few audio delivered characters that are in a form that prevents a computer/software robot from recognizing said audio delivered a few characters, a peripheral device incorporating electric field (EF) sensing, a standalone device performing electric field (EF) sensing, an ultrasonic sensing device, an optoelectronic sensing device based on electro-magnetic reflection, a physical presence sensing device based on infrared reflection, a physical presence sensing device based on microwave reflection, a pyroelectric system, a laser system, an inductive system, a triboelectric sensing system, a fingerprint reader, a hand scanner, a retina scanner, an iris scanner, a voice recognition system, and a face recognition system.

3. The computerized method of claim 1 wherein said at least one physical presence indicating mechanism is coupled to said computer system via at least one of a group comprising: a coupling between said at least one physical presence indicating mechanism and a communications bus of said computer system; a coupling between said at least one physical presence indicating mechanism and a communications port of said computer system; and a coupling between said computer system and a display/keyboard/cursor control device for data display/entry by a user.

4. The computerized method of claim 1 wherein said human origination indication containing information verifying that said electronic message is human originated used to mark said electronic message is associated with said electronic message via at least one of a group comprising: placing said human origination indicator within a header of said electronic message, placing said human origination indicator within a proprietary X-header of said electronic message, placing said human origination indicator within a standard Biomark-header of said electronic message, placing said human origination indicator within a standard Human Origination-header of said electronic message.

5. A computer system for conveying human origination of an electronic message to at least one recipient comprising:
    at least one physical presence indicating mechanism coupled to said computer system;
    a processor coupled to a memory and programmed with instructions to determine that said message is human originated if output of said at least one physical presence indicating mechanism indicate a physical presence and mark said electronic message with a human origination indication containing information verifying that said electronic message is human originated if said electronic message was determined to be human originated such that at least one recipient receives said electronic message and said human origination indication containing said information verifying said electronic message is human originated in order to convey to said at least one recipient that said electronic message is human originated, wherein a biomark is used in assisting to determine whether the electronic message is human originated, and wherein the biomark is associated with a unique physical characteristic of an end user that originated the electronic message, wherein the human origination indication containing information is wrapped in a first digital signature that is included in the electronic message and that reflects an originating timestamp, and wherein the electronic message includes a second digital signature reflecting the biomark being associated with personal identity information.

6. The computer system of claim 5 wherein said at least one physical presence indicating mechanism is comprised of at least one of a group comprising: a physical presence verification device, a biometric device, a smart card reader, a signature verification system, a magnetic keycard reader, a security token reader, an access-control device, a verification test system, a verification test system incorporating a visual test requiring a human operator to type in a few characters that appear in a form that prevents a computer/software robot from recognizing said few characters, a verification test system incorporating an auditory test requiring a human operator to type in a few audio delivered characters that are in a form that prevents a computer/software robot from recognizing said audio delivered few characters, a peripheral device incorporating electric field (EF) sensing, a standalone device performing electric field (EF) sensing, an ultrasonic sensing device, an optoelectronic sensing device based on electromagnetic reflection, a physical presence sensing device based on infrared reflection, a physical presence sensing device based on microwave reflection, a pyroelectric system, a laser system, an inductive system, a triboelectric sensing system, a fingerprint reader, a hand scanner, a retina scanner, an iris scanner, a voice recognition system, and a face recognition system.

7. The computer system of claim 5 wherein said at least one physical presence indicating mechanism is coupled to said computer system via at least one of a group comprising: a coupling between said at least one physical presence indicating mechanism and a communications bus of said computer system; a coupling between said at least one physical presence indicating mechanism and a communications port of said computer system; and a coupling between said computer system and a display/keyboard/cursor control device for data display/entry by a user.

8. The computer system of claim 5 wherein said human origination indication containing information verifying that said electronic message is human originated used to mark said electronic message is associated with said electronic message via at least one of a group comprising: placing said human origination indicator within a header of said electronic message, placing said human origination indicator within a proprietary X-header of said electronic message, placing said human origination indicator within a standard Biomark-header of said electronic message, placing said human origination indicator within a standard Human Origination-header of said electronic message.

9. A non-transitory computer readable medium that stores a computer program product, said computer program product containing instructions for a computer system having a central processing unit (CPU) to perform processes for conveying human origination of an electronic message to at least one recipient, said processes comprising:

determining that said message is human originated if output of said at least one physical presence indicating mechanism indicates a physical presence, wherein a biomark is used in assisting in the determining whether the message is human originated, and wherein the biomark is associated with a unique physical characteristic of an end user that originated the message;

marking said electronic message with a human origination indication containing information verifying that said electronic message is human originated if said electronic message was determined to be human originated, wherein the human origination indication containing information is wrapped in a first digital signature that is included in the electronic message and that reflects an originating timestamp, and wherein the electronic message includes a second digital signature reflecting the biomark being associated with personal identity information;

receiving said electronic message and said human origination indication containing said information verifying said electronic message is human originated by at least one recipient; and conveying to said at least one recipient of said electronic message that said electronic message is human originated by said human origination indication of said electronic message.

10. The machine-readable medium that stores said computer program product of claim 9 wherein said at least one physical presence indicating mechanism is comprised of at least one of a group comprising: a physical presence verification device, a biometric device, a smart card reader, a signature verification system, a magnetic keycard reader, a security token reader, an access-control device, a verification test system, a verification test system incorporating a visual test requiring a human operator to type in a few characters that appear in a form that prevents a computer/software robot from recognizing said few characters, a verification test system incorporating an auditory test requiring a human operator to type in a few audio delivered characters that are in a form that prevents a computer/software robot from recognizing said audio delivered few characters, a peripheral device incorporating electric field (EF) sensing, a standalone device performing electric field (EF) sensing, an ultrasonic sensing device, an optoelectronic sensing device based on electromagnetic reflection, a physical presence sensing device based on infrared reflection, a physical presence sensing device based on microwave reflection, a pyroelectric system, a laser system, an inductive system, a triboelectric sensing system, a fingerprint reader, a hand scanner, a retina scanner, an iris scanner, a voice recognition system, and a face recognition system.

11. The machine-readable medium that stores said computer program product of claim 9 wherein said at least one physical presence indicating mechanism is coupled to said computer system via at least one of a group comprising: a coupling between said at least one physical presence indicating mechanism and a communications bus of said computer system; a coupling between said at least one physical presence indicating mechanism and a communications port of said computer system; and a coupling between said computer system and a display/keyboard/cursor control device for data display/entry by a user.

12. The machine-readable medium that stores said computer program product of claim 9 wherein said human origination indication containing information verifying that said electronic message is human originated used to mark said electronic message is associated with said electronic message via at least one of a group comprising: placing said human origination indicator within a header of said electronic message, placing said human origination indicator within a proprietary X-header of said electronic message, placing said human origination indicator within a standard Biomark-header of said electronic message, placing said human origination indicator within a standard Human Origination-header of said electronic message.

* * * * *